(12) United States Patent
Rambo et al.

(10) Patent No.: US 11,174,789 B2
(45) Date of Patent: Nov. 16, 2021

(54) AIR CYCLE ASSEMBLY FOR A GAS TURBINE ENGINE ASSEMBLY

(71) Applicant: General Electric Company, Schenectady, NY (US)

(72) Inventors: Jeffrey Douglas Rambo, Mason, OH (US); Gregory Michael Petrasko, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 574 days.

(21) Appl. No.: 15/986,943

(22) Filed: May 23, 2018

(65) Prior Publication Data

US 2019/0360401 A1 Nov. 28, 2019

(51) Int. Cl.
*F02C 7/14* (2006.01)
*F02C 7/224* (2006.01)

(52) U.S. Cl.
CPC ............... *F02C 7/14* (2013.01); *F02C 7/224* (2013.01)

(58) Field of Classification Search
CPC ...... F02C 6/08; F02C 7/14; F02C 7/18; F02C 7/224; B64D 13/08; B64D 2013/0611; B64D 2013/0618
See application file for complete search history.

(56) References Cited

U.S. PATENT DOCUMENTS

| | | |
|---|---|---|
| 2,582,842 A | 1/1952 | Messinger |
| 3,651,645 A | 3/1972 | Grieb |
| 4,078,604 A | 3/1978 | Christl et al. |
| 4,505,124 A | 3/1985 | Mayer |
| 4,550,573 A | 11/1985 | Rannenberg |
| 4,773,212 A | 9/1988 | Griffin et al. |
| 5,297,386 A | 3/1994 | Kervistin |
| 5,317,877 A | 6/1994 | Stuart |
| 5,619,855 A | 4/1997 | Burrus |
| 5,667,168 A | 9/1997 | Fluegel |
| 5,680,767 A | 10/1997 | Lee et al. |
| 5,724,816 A | 3/1998 | Ritter et al. |
| 5,782,076 A | 7/1998 | Huber et al. |
| 5,802,841 A | 9/1998 | Maeda |
| 5,819,525 A | 10/1998 | Gaul et al. |

(Continued)

FOREIGN PATENT DOCUMENTS

| | | |
|---|---|---|
| GB | 2136880 A | 9/1984 |
| GB | 2204361 A | 11/1988 |

(Continued)

*Primary Examiner* — Jason H Duger
(74) *Attorney, Agent, or Firm* — Dority & Manning, P.A.

(57) ABSTRACT

A gas turbine engine assembly includes a turbomachine including a compressor section, a combustion section, and a turbine section in serial flow order; a fuel delivery system operable with the combustion section of the turbomachine for providing fuel to the combustion section of the turbomachine; and an air cycle assembly including an air cycle machine and a heat exchanger, the air cycle machine in airflow communication with the compressor section of the turbomachine and the heat exchanger in airflow communication with the air cycle machine. The gas turbine engine assembly also includes a thermal transfer bus thermally coupling the heat exchanger of the air cycle assembly to the fuel delivery system for transferring heat from the air cycle machine to the fuel delivery system.

18 Claims, 9 Drawing Sheets

(56) References Cited

U.S. PATENT DOCUMENTS

| | | |
|---|---|---|
| 6,182,435 B1 | 2/2001 | Niggemann et al. |
| 6,250,097 B1 | 6/2001 | Lui et al. |
| 6,415,595 B1 | 7/2002 | Wilmot, Jr. et al. |
| 6,578,362 B1 | 6/2003 | Coffinberry |
| 6,584,778 B1 | 7/2003 | Griffiths et al. |
| 6,701,717 B2 | 3/2004 | Flatman et al. |
| 6,939,392 B2 | 9/2005 | Huang et al. |
| 7,059,136 B2 | 6/2006 | Coffinberry |
| 7,260,926 B2 | 8/2007 | Sabatino et al. |
| 7,377,098 B2 | 5/2008 | Walker et al. |
| 7,398,641 B2 | 7/2008 | Stretton et al. |
| 7,406,829 B2 * | 8/2008 | Coffinberry ............... F02C 1/00 60/801 |
| 7,882,704 B2 | 2/2011 | Chen |
| 8,261,528 B2 | 9/2012 | Chillar et al. |
| 8,499,822 B2 | 8/2013 | Bulin et al. |
| 8,522,572 B2 | 9/2013 | Coffinberry et al. |
| 8,789,376 B2 | 7/2014 | Coffinberry |
| 8,922,330 B2 | 12/2014 | Moberg et al. |
| 8,943,827 B2 | 2/2015 | Prociw et al. |
| 8,944,367 B2 | 2/2015 | Bystry, Jr. et al. |
| 8,984,884 B2 | 3/2015 | Xu et al. |
| 9,038,397 B2 | 5/2015 | Papa et al. |
| 9,109,842 B2 | 8/2015 | Prociw et al. |
| 9,354,621 B2 | 5/2016 | Westervelt et al. |
| 9,810,158 B2 | 11/2017 | Foutch et al. |
| 2009/0188234 A1 | 7/2009 | Suciu et al. |
| 2012/0000205 A1* | 1/2012 | Coffinberry ............... F02C 7/14 60/806 |
| 2012/0297789 A1* | 11/2012 | Coffinberry ............. F01D 25/12 60/785 |
| 2013/0055724 A1 | 3/2013 | Finney et al. |
| 2013/0186100 A1* | 7/2013 | Rhoden ................ B64D 13/006 60/782 |
| 2014/0023945 A1 | 1/2014 | Epstein et al. |
| 2014/0205446 A1 | 7/2014 | Patsouris et al. |
| 2014/0345292 A1 | 11/2014 | Diaz et al. |
| 2015/0000291 A1 | 1/2015 | Smith et al. |
| 2016/0108819 A1 | 4/2016 | Dreher et al. |
| 2016/0131036 A1 | 5/2016 | Bintz et al. |
| 2017/0022900 A1 | 1/2017 | Miller et al. |
| 2017/0023018 A1 | 1/2017 | Miller et al. |
| 2017/0030266 A1 | 2/2017 | Cerny et al. |
| 2017/0114721 A1 | 4/2017 | Miller et al. |
| 2017/0167382 A1* | 6/2017 | Miller .................... B64D 33/02 |
| 2017/0204787 A1 | 7/2017 | Duesler et al. |

FOREIGN PATENT DOCUMENTS

| | | |
|---|---|---|
| JP | S5932893 U | 2/1984 |
| WO | WO2011038188 A1 | 3/2011 |
| WO | WO2014105327 A1 | 7/2014 |

\* cited by examiner

AIR CYCLE ASSEMBLY FOR A GAS TURBINE ENGINE ASSEMBLY

FIELD

The present subject matter relates generally to an air cycle assembly for a gas turbine engine assembly.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

An air cycle machine may also be provided. The air cycle machine may receive a bleed airflow from the turbomachine and condition such airflow for use in various cooling operations. Such conditioning may require removal of a relatively large amount of heat. This heat may be removed using a bypass passage of the gas turbine engine. However, such may be a relatively inefficient heat sink for the air cycle machine and further may not fully utilize the potential of the heat removed. Accordingly, a gas turbine engine and air cycle machine having the ability to more efficiently and completely remove and utilize such heat would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine assembly is provided. The gas turbine engine assembly includes a turbomachine including a compressor section, a combustion section, and a turbine section in serial flow order; a fuel delivery system operable with the combustion section of the turbomachine for providing fuel to the combustion section of the turbomachine; and an air cycle assembly including an air cycle machine and a heat exchanger, the air cycle machine in airflow communication with the compressor section of the turbomachine and the heat exchanger in airflow communication with the air cycle machine. The gas turbine engine assembly also includes a thermal transfer bus thermally coupling the heat exchanger of the air cycle assembly to the fuel delivery system for transferring heat from the air cycle machine to the fuel delivery system.

In certain exemplary embodiments the thermal transfer bus includes a thermal energy storage unit.

In certain exemplary embodiments the heat exchanger of the air cycle assembly is an ACS heat exchanger, wherein the thermal transfer bus includes a fuel heat exchanger for transferring heat to the fuel delivery system, and wherein the fuel delivery system includes a fuel cooled oil cooler at a location upstream of the fuel heat exchanger.

In certain exemplary embodiments the air cycle assembly includes a thermal energy storage unit at a location downstream of the air cycle machine.

In certain exemplary embodiments the thermal transfer bus includes a pump, and wherein the pump is mechanically driven by the air cycle machine.

In certain exemplary embodiments the thermal transfer bus includes a turbopump, wherein the turbopump includes a power turbine in airflow communication with the compressor section of the turbomachine at a location upstream of the air cycle machine.

In certain exemplary embodiments the air cycle machine includes a compressor for receiving and compressing a bleed airflow from the compressor section of the turbomachine and a turbine rotatable with the compressor and positioned downstream of the compressor, the turbine of the air cycle machine configured to expand and cool the compressed bleed airflow from the compressor.

For example, in certain exemplary embodiments the heat exchanger is in airflow communication with the compressor of the air cycle machine at a location downstream of the compressor of the air cycle machine and the turbine of the air cycle machine at a location upstream of the turbine of the air cycle machine.

For example, in certain exemplary embodiments the turbine of the air cycle machine is a first turbine, wherein the air cycle machine further includes a second turbine and a combustor, wherein the combustor is located upstream of the second turbine, and wherein the second turbine is rotatable with the compressor of the air cycle machine.

For example, in certain exemplary embodiments the heat exchanger is in airflow communication with the second turbine of the air cycle machine at a location downstream of the second turbine of the air cycle machine.

For example, in certain exemplary embodiments the heat exchanger of the air cycle assembly is a first ACS heat exchanger, wherein the air cycle assembly further includes a second ACS heat exchanger, wherein the first ACS heat exchanger is positioned downstream of the compressor of the air cycle machine and upstream of the first turbine of the air cycle machine.

For example, in certain exemplary embodiments the second ACS heat exchanger is in thermal communication with a bypass airflow passage of the gas turbine engine.

For example, in certain exemplary embodiments the heat exchanger of the air cycle assembly is a second ACS heat exchanger, wherein the air cycle assembly further includes a first ACS heat exchanger, wherein the first ACS heat exchanger is positioned downstream of the compressor of the air cycle machine and upstream of the first turbine of the air cycle machine, wherein the second ACS heat exchanger is positioned downstream of the second turbine, and wherein the second ACS heat exchanger is in thermal communication with a bypass airflow passage of the gas turbine engine.

For example, in certain exemplary embodiments the thermal transfer bus includes a turbopump, wherein the turbopump includes a power turbine in airflow communication with the air cycle machine at a location downstream of the second turbine of the air cycle machine.

In certain exemplary embodiments the thermal transfer bus utilizes a single phase heat transfer fluid during operation.

In an exemplary aspect of the present disclosure, a method for operating the gas turbine engine assembly is provided. The gas turbine engine assembly includes a turbomachine, a fuel delivery system, an air cycle assembly, and a thermal transfer bus. The method includes providing a bleed airflow from a compressor section of the turbomachine to an air cycle machine of the air cycle assembly; and transferring heat from the bleed airflow through the air cycle machine of the air cycle assembly to the fuel delivery system through the thermal transfer bus to cool the airflow through the air cycle machine of the air cycle assembly.

In certain exemplary aspects transferring heat from the bleed airflow through the air cycle machine of the air cycle assembly to the fuel delivery system through the thermal transfer bus includes reducing a temperature of the bleed airflow using an ACS heat exchanger thermally coupled to the thermal transfer bus by at least about 150 degrees Fahrenheit.

In certain exemplary aspects transferring heat from the bleed airflow through the air cycle machine of the air cycle assembly to the fuel delivery system through the thermal transfer bus further includes increasing a temperature of a fuel flow through the fuel delivery system by at least about 200 degrees Fahrenheit.

In certain exemplary aspects the method further includes providing the bleed airflow from the air cycle machine to an output assembly of the air cycle assembly at a pressure greater than about 50 pounds per square inch absolute and less than about 600 pounds per square inch absolute.

In certain exemplary aspects transferring heat from the bleed airflow through the air cycle machine of the air cycle assembly to the fuel delivery system through the thermal transfer bus to cool the airflow through the air cycle machine of the air cycle assembly includes circulating a thermal transfer fluid through one or more conduits of the thermal transfer bus between an ACS heat exchanger thermally coupling the thermal transfer fluid to the bleed airflow and a fuel heat exchanger thermally coupling the thermal transfer fluid to a fuel flow through the fuel delivery system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
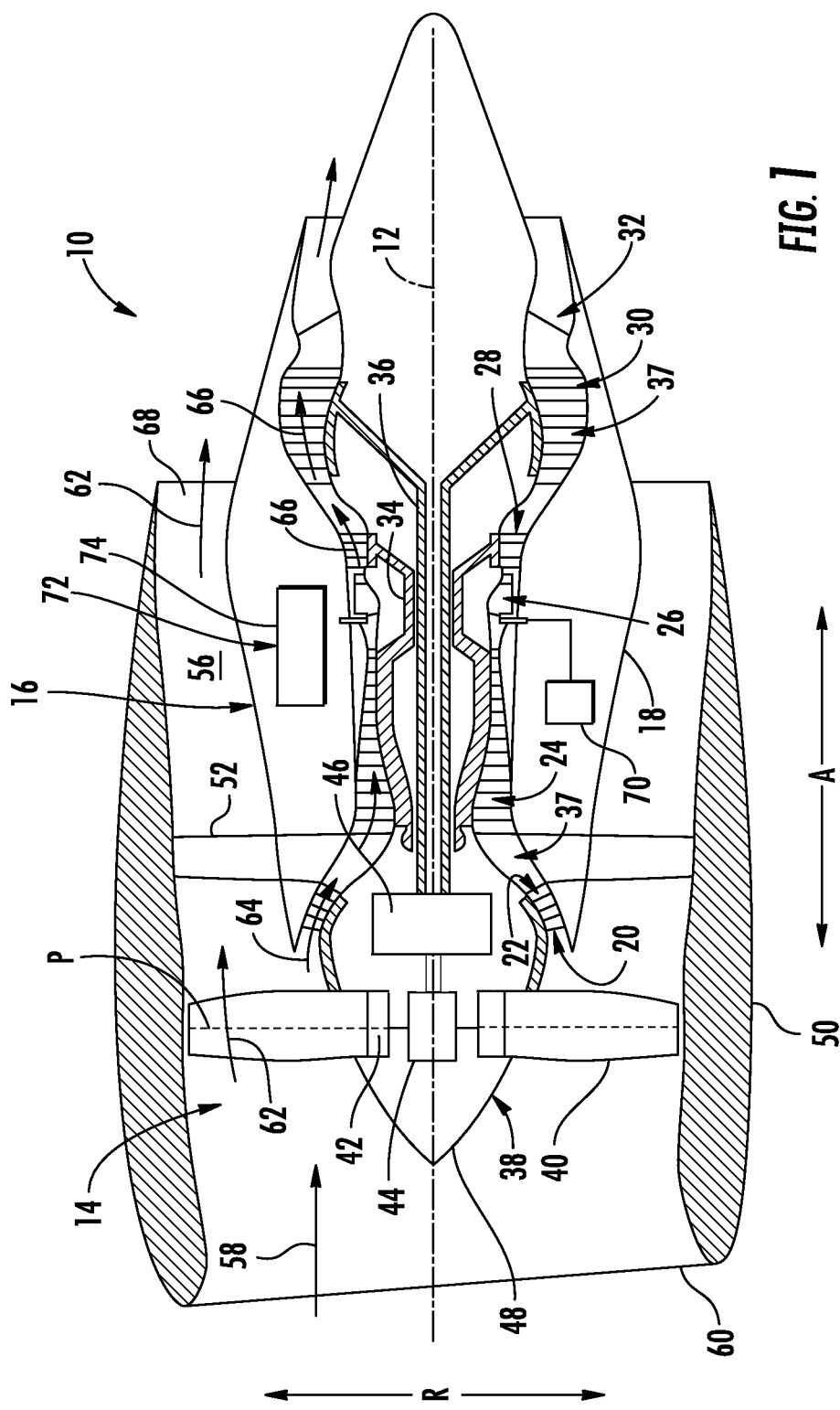
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figs., FIG. 1 is a schematic, cross-sectional view of an aeronautical gas turbine engine in accordance with an exemplary embodiment of the present disclosure. More particularly, for the embodiment of FIG. 1, the aeronautical gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 (or rather a high pressure spool assembly, as described below) drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 68 of the turbofan 10, also providing propulsive thrust.

Moreover, as is depicted schematically, the exemplary turbofan engine 10 is part of a gas turbine engine assembly, the gas turbine engine assembly further including various accessory systems to aid in the operation of the turbofan engine 10 and/or an aircraft including the exemplary turbofan engine 10. For example, as is depicted, the exemplary gas turbine engine assembly further includes a fuel delivery system 70 operable with the combustion section 26 of the turbomachine 16 of the turbofan engine 10 for providing fuel to the combustion section 26. The exemplary fuel delivery system 70 may include one or more fuel delivery lines, a fuel pump (not shown), etc. Further, the exemplary gas turbine engine assembly includes an air cycle assembly 72, as will be explained in greater detail below. It will be appreciated that the air cycle assembly 72 generally includes an air cycle machine 74 configured to receive a bleed airflow from the compressor section of the turbomachine 16. The air cycle machine 74 may generally compress such airflow, remove heat from such airflow, and then expand such airflow, such that the air cycle machine 74 converts such bleed airflow to a relatively cool airflow. The relatively cool airflow may be used for a variety of purposes within, e.g., the turbofan engine 10, the aircraft (with which the turbofan engine 10 is installed; not shown), etc. For example, the relatively cool airflow from the air cycle machine 74 may be used as part of a compressor cooling airflow (e.g., an airflow provided from the compressor section to the turbine section to cool the turbine section), as a heat sink for the low pressure turbine, for various sump cooling, for cooling within an environmental control system of an aircraft, etc. It should be appreciated, however, that in other exemplary embodiments, the turbofan engine 10 may instead be configured in any other suitable manner, i.e., as any other suitable gas turbine engine.

Figure 2:
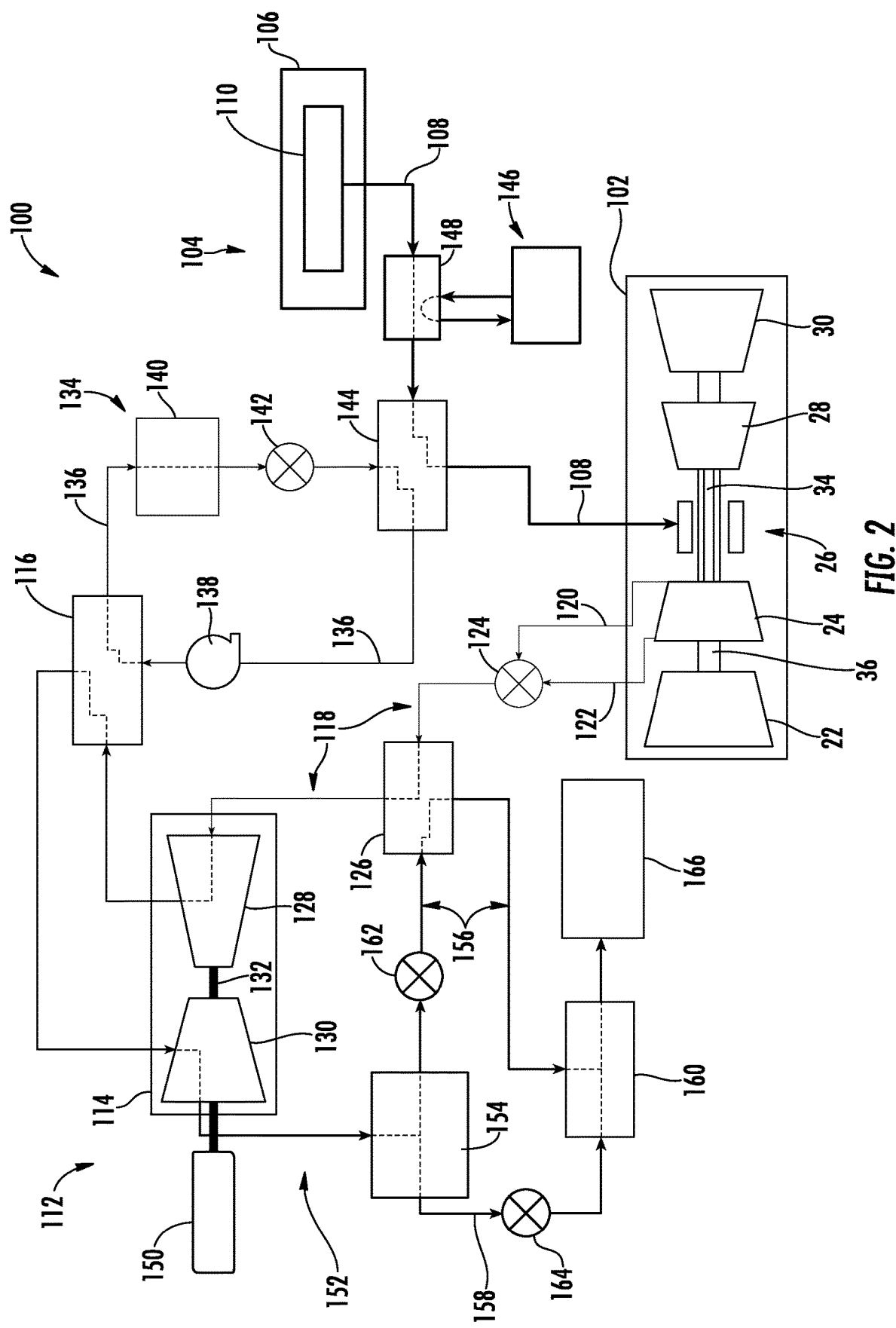
FIG. 2 is a schematic, flow diagram of a gas turbine engine assembly in accordance with an exemplary embodiment of the present disclosure.

Referring now to FIG. 2, a schematic, flow diagram is provided of a gas turbine engine assembly 100 in accordance with an exemplary embodiment of the present disclosure. The exemplary gas turbine engine assembly 100 of FIG. 2 may be configured in substantially the same manner as exemplary gas turbine engine assembly described above with reference to FIG. 1. For example, the exemplary gas turbine engine assembly 100 generally includes a gas turbine engine having a turbomachine 102. The gas turbine engine may be, e.g., a turbofan engine, a turboprop engine, turboshaft engine, turbojet engine, etc.

For example, the gas turbine engine may be configured in a similar manner as the turbofan engine 10 described above. Accordingly, the gas turbine engine may of FIG. 2 may generally include, as noted, the turbomachine 102 having a compressor section having a low pressure (LP) compressor 22 and a high pressure (HP) compressor 24; a combustion section 26; and a turbine section including a high pressure (HP) turbine 28 and a low pressure (LP) turbine 30. The compressor section, combustion section 26, and turbine section are arranged in serial flow order. A high pressure (HP) shaft or spool 34 drivingly connects the HP turbine 28 to the HP compressor 24, and a low pressure (LP) shaft or spool 36 drivingly connects the LP turbine 30 to the LP compressor 22.

Further, the exemplary gas turbine engine assembly 100 of FIG. 2 includes a fuel delivery system 104 (which may be configured in a similar manner as the fuel delivery system 70 of FIG. 1) operable with the combustion section 26 of the turbomachine 102 of the exemplary gas turbine engine for providing fuel to the combustion section 26 of the turbomachine 102 of the exemplary gas turbine engine. For the embodiment depicted, the fuel delivery system 104 generally includes a high temperature fuel source 106 and a plurality of fuel lines 108, the plurality of fuel lines 108 transporting fuel from the high temperature fuel source 106 to the combustion section 26 of the turbomachine 102. The high temperature fuel source 106 includes an oxygen reduction unit 110 to reduce a level of oxygen within the fuel to minimize a risk of the fuel coking when the fuel is exposed to relatively high temperatures, as will be discussed in greater detail below. The oxygen reduction unit 110 may be, e.g., a fuel deoxygenation unit, a fuel oxygen conversion unit, or other systems or structures performing such function. Although not depicted, the oxygen reduction unit 110 may receive a fuel flow from one or more fuel tanks of an aircraft including the gas turbine engine assembly 100, and provide the fuel flow to the plurality of fuel lines 108.

Referring still to FIG. 2, the exemplary gas turbine engine assembly 100 further includes an air cycle assembly 112. The air cycle assembly 112 generally includes an air cycle machine 114 and an air cycle system ("ACS") heat exchanger 116. The air cycle machine 114 is in airflow communication with the compressor section of the turbomachine 102 and the ACS heat exchanger 116 is, in turn, in airflow communication with the air cycle machine 114.

For the embodiment depicted, the exemplary air cycle assembly 112 includes a bleed airflow line 118 in airflow communication with the compressor section of the turbomachine 102 of the exemplary gas turbine engine. More specifically, the bleed airflow line 118 is in airflow communication with the HP compressor 24, and more specifically still, includes a first portion 120 in airflow communication with a high-pressure end of the HP compressor 24 and a second portion 122 in airflow communication with a low pressure end of the HP compressor 24. For example, the first portion 120 may be configured to receive a bleed airflow from a downstream stage of the HP compressor 24 at a relatively high pressure, and the second portion 122 may be configured to receive a bleed airflow from an upstream stage of the HP compressor 24 at a relatively low pressure. It will be appreciated that typically, the air cycle assembly 112 requires a certain driving pressure from the bleed airflow received through the bleed airflow line 118. For example, while it is generally preferable to take the bleed airflow from the upstream/low-pressure stage of the HP compressor 24 for efficiency purposes, such may not be practical during all operating conditions of the turbomachine 102. Accordingly, bleed airflow may be taken, for example, from the downstream stage of the HP compressor 24 (i.e., a high pressure stage) during low power conditions, and from the upstream stage of the HP compressor 24 (i.e., a low pressure stage) during high power conditions.

The first portion 120 and the second portion 122 of the bleed airflow line 118 meet at a three-way valve 124, also referred to as a bleed port switching valve, of the bleed airflow line 118, where bleed airflow from the first portion 120 and the second portion 122 are merged. The three-way valve 124 may be a variable valve operably connected to, e.g., a controller (not shown) of the gas turbine engine to control a pressure of the bleed airflow provided to the air cycle machine 114 through the bleed airflow line 118. Notably, although not depicted, a pressure regulator and/or emergency shut-off valve may additionally be provided in the bleed airflow line 118 to ensure an over-pressure and/or over-temperature event doesn't damage the air cycle assembly 112.

It will be appreciated, however, in other exemplary embodiments the bleed airflow line 118 may include any other suitable structure or configuration for receiving a bleed airflow from the compressor section of the turbomachine 102.

For the embodiment depicted, the air cycle assembly 112 further includes an ACS pre-cooler 126. The bleed airflow line 118 is in airflow communication with the ACS pre-cooler 126 at a location upstream of the air cycle machine 114. As will be explained in more detail below, the ACS pre-cooler 126 may provide an initial amount of cooling to the bleed airflow provided to the air cycle machine 114 through the bleed airflow line 118. It will be appreciated, however, that in other embodiments, the air cycle assembly 112 may not include the ACS pre-cooler 126, or any other suitable ACS pre-cooler 126 configuration may be provided.

The bleed airflow line 118 then provides the bleed airflow to the air cycle machine 114. As is depicted, the exemplary air cycle machine 114 of FIG. 2 generally includes a compressor 128 for receiving and compressing the bleed airflow from the compressor section of the turbomachine 102 (i.e., through the bleed airflow line 118) and a turbine 130 rotatable with the compressor 128 and positioned downstream of the compressor 128. More specifically, the compressor 128 is coupled to the turbine 130 through an ACS shaft 132. The compressor 128 may generally compress the bleed airflow provided thereto (increasing a temperature and pressure of such bleed airflow), while the turbine 130 of the air cycle machine 114 may generally expand and cool the previously compressed bleed airflow from the compressor 128.

Further, as stated, the exemplary air cycle assembly 112 generally includes the ACS heat exchanger 116 in airflow communication with the air cycle machine 114. More specifically, for the embodiment depicted the ACS heat exchanger 116 is in airflow communication with the compressor 128 of the air cycle machine 114 at a location downstream of the compressor 128 of the air cycle machine 114, and the turbine 130 of the air cycle machine 114 a location upstream of the turbine 130 of the air cycle machine 114. In such a manner, the bleed airflow compressed by the compressor 128 of the air cycle machine 114 may be provided to the ACS heat exchanger 116, and subsequently such bleed airflow may be provided from the ACS heat exchanger 116 to the turbine 130 of the air cycle machine 114.

Moreover, referring still to FIG. 2, in order to remove heat from the compressed bleed airflow through the ACS heat exchanger 116, the gas turbine engine assembly 100 further includes a thermal transfer bus 134. The exemplary thermal transfer bus 134 thermally couples the ACS heat exchanger 116 of the air cycle assembly 112 to the fuel delivery system 104. In such a manner, the thermal transfer bus 134 may generally transfer heat from a bleed airflow through the air cycle machine 114, or more particularly, through the ACS heat exchanger 116, to the fuel delivery system 104. Such a configuration allows the heat transfer bus 134 to act as a buffer between the compressed bleed airflow and the flow of fuel through the fuel delivery system 104 to reduce or eliminate the possibility of fuel and high-temperature air from mixing outside the combustion section 26 of the turbomachine 102.

As will be appreciated, compressing the bleed airflow (and thereby increasing a temperature and pressure of such bleed airflow) prior to providing such bleed airflow to the ACS heat exchanger 116 allows for a greater amount of heat removal from such bleed airflow, such that a lower overall temperature may be reached when the bleed airflow is subsequently expanded through the turbine 130 of the air cycle machine 114. More specifically, compressing the bleed airflow prior to providing such bleed airflow to the ACS heat exchanger 116 creates a larger temperature delta between the bleed airflow and the heat exchange fluid through the thermal transfer bus 134 to facilitate a greater heat transfer therebetween.

For the embodiment depicted, the thermal transfer bus 134 generally includes a series of conduits 136, a pump 138 for generating a flow of a thermal transfer fluid through the series of conduits 136, a thermal energy storage unit 140, a valve 142, and a fuel heat exchanger 144. During operation, the series of conduits 136 provides the thermal transfer fluid through the ACS heat exchanger 116, wherein the thermal transfer fluid accepts heat from the bypass airflow through the ACS heat exchanger 116. The heated thermal transfer fluid then flows through the thermal energy storage unit 140, wherein thermal energy may be stored during at least certain operations. For example, during certain operations, the thermal energy storage unit 140 may include an energy storage medium, such as a wax, liquid metal, molten salt, fusible alloy, etc. to absorb thermal energy and later release such thermal energy on-demand. For example, the thermal energy storage unit 140 may store heat during operation and subsequently release it during, e.g., conditions where the air cycle assembly 112 does not generate a desired amount of heat. Notably, however, in other exemplary embodiments, the thermal transfer bus 134 may not include the thermal energy storage unit 140.

Referring still to the embodiment of FIG. 2, the thermal transfer fluid may then flow through the valve 142 and to, and through, the fuel heat exchanger 144. Within the fuel heat exchanger 144, the thermal transfer fluid may provide heat to a flow of fuel provided therethrough from the fuel delivery system 104 (and more specifically from the fuel lines 108). In such a manner, the thermal transfer bus 134 may transfer heat from the air cycle machine 114 to the fuel delivery system 104. It will be appreciated that increasing a temperature of the fuel flow provided to the combustion section 26 of the turbomachine 102 may generally result in an overall more efficient operation of the turbomachine 102.

It will be appreciated that for the embodiment depicted, the thermal transfer bus 134 utilizes a single phase heat transfer fluid during operation. More specifically, during operation of the gas turbine engine assembly 100, substantially all of the thermal transfer fluid through the thermal transfer bus 134 remains in a single phase (such as a liquid phase, a gas phase, or supercritical phase). However, in other embodiments, the thermal transfer bus 134 may instead utilize a phase change fluid configured to change phases during operation.

Notably, for the exemplary embodiment depicted, the fuel delivery system 104 is also thermally coupled to a lubrication system 146 of the gas turbine engine assembly 100. The lubrication system 146 may be an oil lubrication system for a plurality of bearings within the gas turbine engine (not shown). As is also depicted, the fuel delivery system 104 further includes a fuel cooled oil cooler 148 at a location upstream of the fuel heat exchanger 144. The fuel cooled oil cooler 148 thermally couples the lubrication system 146 to the fuel flow through the fuel delivery system 104, such that the fuel flow through the fuel delivery system 104 may accept heat from the lubrication system 146 to reduce a temperature of a lubrication oil of the lubrication system 146, and increase a temperature of the fuel flow through the fuel delivery system 104 (and more specifically, fuel lines 108).

Referring now back to the air cycle assembly 112 of the exemplary gas turbine engine assembly 100 of FIG. 2, it will be appreciated that the exemplary air cycle machine 114 depicted is further mechanically coupled to an electric machine. More specifically, the electric machine is configured as a starter motor/generator 150. Such a manner, the starter motor/generator 150 may be operable to start the air cycle machine 114 during, e.g., starting operations of the gas turbine engine assembly 100, wherein a bleed airflow from the gas turbine engine may be below an amount required to drive the air cycle machine 114. In other operations, however, the amount of bleed airflow extracted from the gas turbine engine may exceed the amount required to drive the air cycle machine 114. In such exemplary aspects, the air cycle machine 114 may instead drive the starter motor/generator 150, such that the exemplary starter motor/generator 150 generates excess electrical power, which may be utilized in any suitable manner.

Moreover, as previously noted, the bleed airflow provided to the air cycle machine 114 (through bleed line 118) is expanded and cooled through the turbine 130 of the air cycle machine 114, subsequent to being compressed by compressor 128 and cooled by ACS heat exchanger 116. This expansion generates the mechanical power for driving the air cycle machine 114. The expanded and cooled bleed airflow from the turbine 130 of the air cycle machine 114 is then provided through an outlet duct assembly 152. For the exemplary embodiment depicted, the air cycle assembly 112 further includes a thermal energy storage unit 154 in airflow communication with air cycle machine 114 at a location downstream of the air cycle machine 114. More specifically, the thermal energy storage unit 154 is in airflow communication with the air cycle machine 114 through the outlet duct assembly 152. The exemplary thermal energy storage unit 154 may include any suitable configuration for storing thermal energy. For example, in certain embodiments, the thermal energy storage unit 154 may include a phase change material, such as a mass of metal molten salt, liquid metal, wax, compressed gas, etc. The thermal energy storage unit 154 may store energy in the form of this cooled material during operation and subsequently release it when the air cycle machine 114 is not providing a cooled airflow (or a desired amount of cooled airflow). For example, the thermal energy storage unit 154 may release the cooled material to generate a cooled airflow during a shutdown of the turbomachine 102 to reduce a risk of a bowed rotor condition.

Referring still to the embodiment of FIG. 2, from the thermal energy storage unit 154 the cooled bleed airflow may be provided through a first path 156 or a second path 158 of the exemplary outlet duct assembly 152. The first path 156 provides the cooled bleed airflow to and through the ACS pre-cooler 126. As briefly noted above, the ACS pre-cooler 126, which is simply an air-to-air heat exchanger for the embodiment depicted, may transfer heat from the bleed airflow from the compressor section of the turbomachine 102 (i.e., through line 118) to the cooled airflow from the air cycle machine 114 through the first path 156. Therefore, the ACS pre-cooler 126 may cool the bleed airflow through line 118 prior to such bleed airflow being provided to the air cycle machine 114. The cooled airflow through the first path 156 (having accepted some heat through the ACS pre-cooler 126) is then provided to a mixing chamber 160 of the air cycle assembly 112. By contrast, the second path 158 extends directly from the thermal energy storage unit 154 to the mixing chamber 160.

Further, for the exemplary embodiment depicted, the air cycle assembly 112 further includes a first valve 162 positioned within the first path 156 of the outlet duct assembly 152 and a second valve 164 positioned within the second path 158 of the outlet duct assembly 152. The first valve 162 and second valve 164 may each be variable throughput valves to vary an amount of airflow allowable through the first path 156 and the second path 158, respectively. Notably, however, in other embodiments, the air cycle assembly 112 may not include one of the first valve 162 or second valve 164, or alternatively, may include a variable, three-way valve at a juncture between the first path 156 and second path 158 (within the unit 154 for the embodiment shown). For example, in other embodiments, the air cycle assembly 112 may not include the thermal energy storage unit 154, and instead may include a variable throughput three-way valve.

Moreover, within the mixing chamber 160 the cooled bleed airflow from the first path 156 and the cooled bleed airflow from the second path 158 may be mixed back together and provided to a heat sink 166. The heat sink 166 may be any suitable heat sink 166 of the exemplary gas turbine engine and/or an aircraft including the exemplary gas turbine engine. For example, in certain exemplary embodiments, the heat sink 166 may be one or more of a cooled compressor air system, a heat sink for the low pressure turbine or other turbine components, may be a sump (such that the airflow is utilized for sump cooling), may be an environmental control system or other aircraft heat load, etc.

Figure 3:
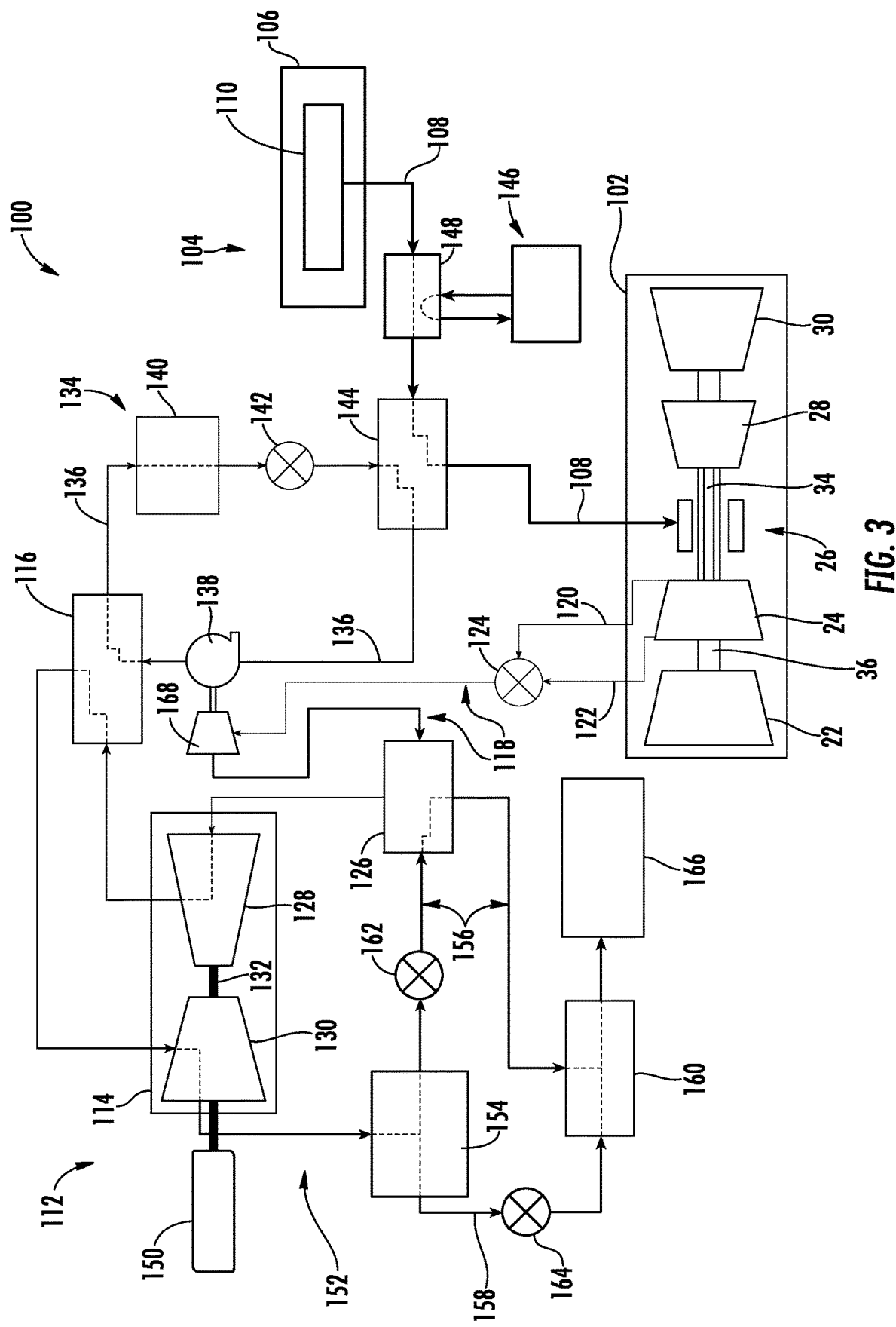
FIG. 3 is a schematic, flow diagram of the gas turbine engine assembly in accordance with another exemplary embodiment of the present disclosure.
Figure 4:
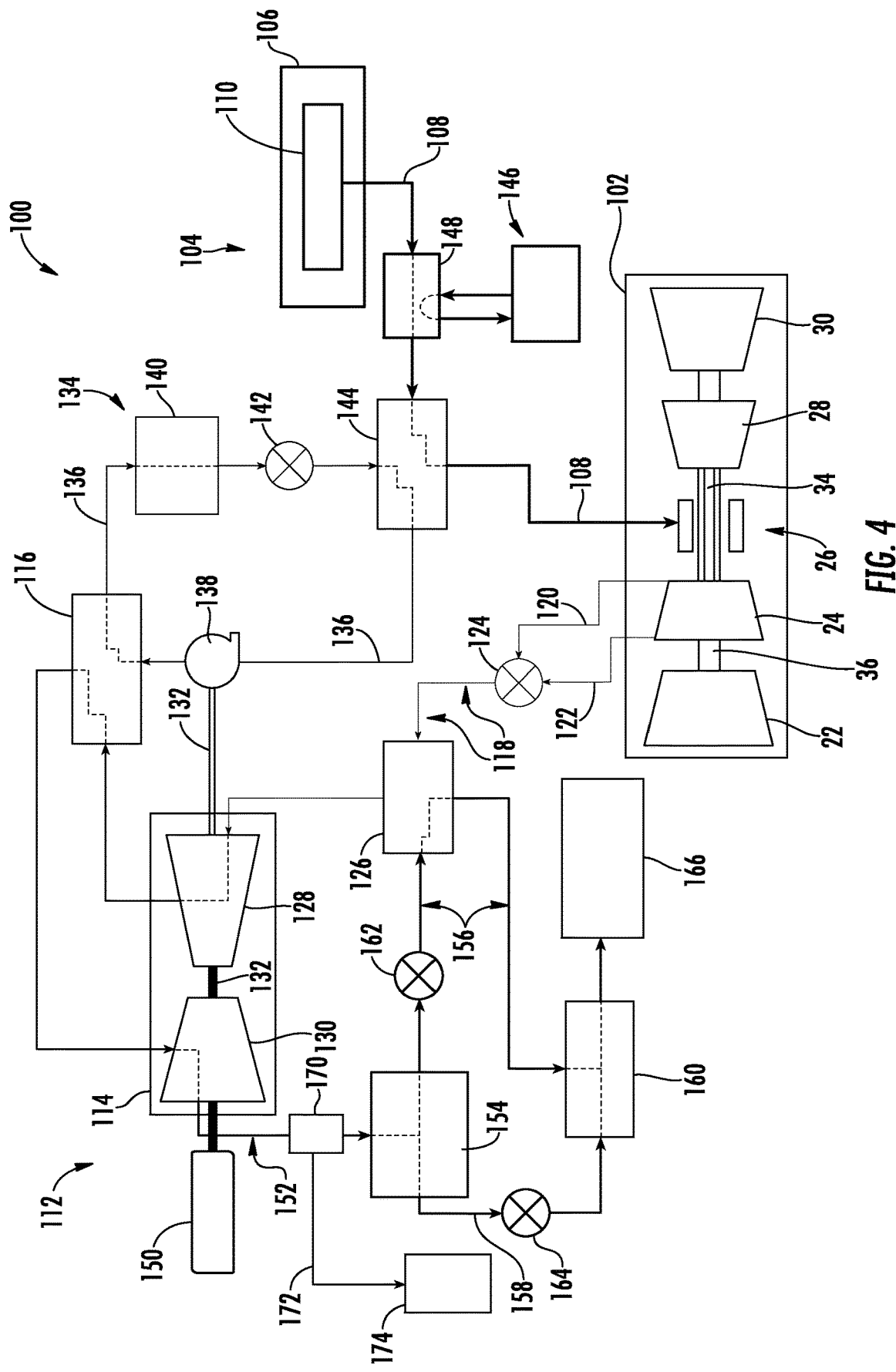
FIG. 4 is a schematic, flow diagram of the gas turbine engine assembly in accordance with yet another exemplary embodiment of the present disclosure.

It will be appreciated, however, that in other exemplary embodiments, the exemplary gas turbine engine assembly 100 may instead have any other suitable configuration. For example, referring now to FIGS. 3 and 4, two other embodiments of a gas turbine engine assembly 100 in accordance with other exemplary embodiments are provided. Each of the embodiments of FIGS. 3 and 4 are configured in substantially the same manner as exemplary gas turbine engine assembly 100 described above with reference to FIG. 2. For example, the exemplary gas turbine engine assemblies 100 of FIGS. 3 and 4 each include a gas turbine engine having a turbomachine 102, a fuel delivery system 104, an air cycle assembly 112, and a thermal transfer bus 134. The thermal transfer bus 134 is configured to thermally couple an ACS heat exchanger 116 of the air cycle assembly 112 to the fuel delivery system 104 for transferring heat from an air cycle machine 114 of the air cycle assembly 112 to the fuel delivery system 104.

Moreover, the thermal transfer bus 134 depicted in each of FIGS. 3 and 4 includes a pump 138 for providing a flow of thermal transfer fluid through a series of conduits 136 of the thermal transfer bus 134. Notably, however, for the embodiments of FIGS. 3 and 4, the pump 138 is generally powered by an aspect of the air cycle assembly 112.

More specifically, referring particularly to FIG. 3, the pump 138 is configured as a turbopump having a power turbine 168 in airflow communication with a compressor section of the turbomachine 102 and a compressor 128 of the air cycle machine 114 at a location upstream of the compressor 128 of the air cycle machine 114. Moreover, for the exemplary embodiment depicted, the power turbine 168 of the turbopump is further located upstream of an ACS pre-cooler 126 of the air cycle assembly 112. In such a manner, the bleed airflow from the compressor section of the turbomachine 102 may flow through the power turbine 168 of the turbopump, powering the turbopump.

Further, referring now particularly to FIG. 4, for the exemplary embodiment depicted, the pump 138 is powered directly by the air cycle machine 114 of the air cycle assembly 112. More specifically, a shaft 132 of the air cycle machine 114, for the exemplary embodiment of FIG. 4, extends from the compressor 128 to the pump 138 to mechanically power, or drive, the pump 138 of the thermal transfer bus 134 during operation of the gas turbine engine assembly 100. Although shown as a continuous shaft 132, in other exemplary embodiments, the shaft 132 may instead be formed of a plurality of components.

Notably, as is also depicted in FIG. 4, the air cycle assembly 112 of the gas turbine engine assembly 100 further includes a condensate separator 170 located downstream of the air cycle machine 114 and upstream of, for the exemplary embodiment depicted, a thermal energy storage unit 154 of the air cycle assembly 112. The condensate separator 170 is configured to provide a subfreezing discharge to the thermal energy storage unit 154, while separating out a dry, cold airflow. The dry, cold airflow is provided through a separate duct 172 to a heat sink 174 (which may be the same heat sink 166 receiving an airflow from a mixing chamber 160 of the air cycle assembly 112). Inclusion of the condensate separator 170 may ensure that any subfreezing discharge (e.g., ice) is not provided to components that may be damaged by such subfreezing discharge.

Moreover, in still other exemplary embodiments of the present disclosure, the gas turbine engine assembly 100 may have still other suitable configurations. For example, referring now to FIGS. 5 and 6, a gas turbine engine assembly 100 in accordance with yet another exemplary embodiment of the present disclosure is provided. The exemplary gas turbine engine assembly 100 of FIGS. 5 and 6 may be configured in substantially the same manner as the exemplary gas turbine engine assembly 100 described above with reference to, e.g., FIG. 2.

Figure 6:
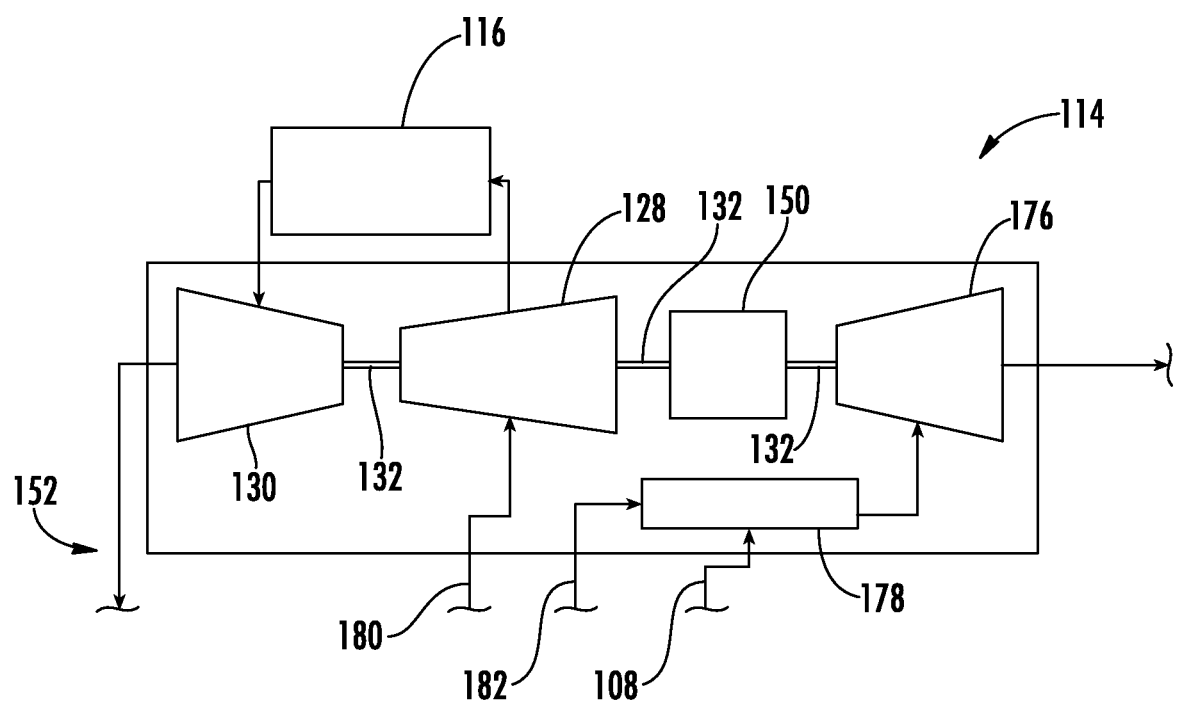
FIG. 6 is a close-up, schematic, flow diagram of an air cycle machine of the exemplary gas turbine engine assembly of FIG. 5.

For example, referring particularly to FIG. 6, providing a schematic flow diagram of the exemplary gas turbine engine assembly 100, the exemplary gas turbine engine assembly 100 generally includes a gas turbine engine having a turbomachine 102, a fuel delivery system 104, an air cycle assembly 112, and a thermal transfer bus 134. The turbomachine 102 generally includes a compressor section having one or more compressors configured to provide a bleed airflow to the air cycle assembly 112 through a bleed airflow line 118. Additionally, the thermal transfer bus 134 is configured to thermally couple an ACS heat exchanger 116 of the air cycle assembly 112 to the fuel delivery system 104 to transfer heat from an air cycle machine 114 of the air cycle assembly 112 to the fuel delivery system 104.

Figure 5:
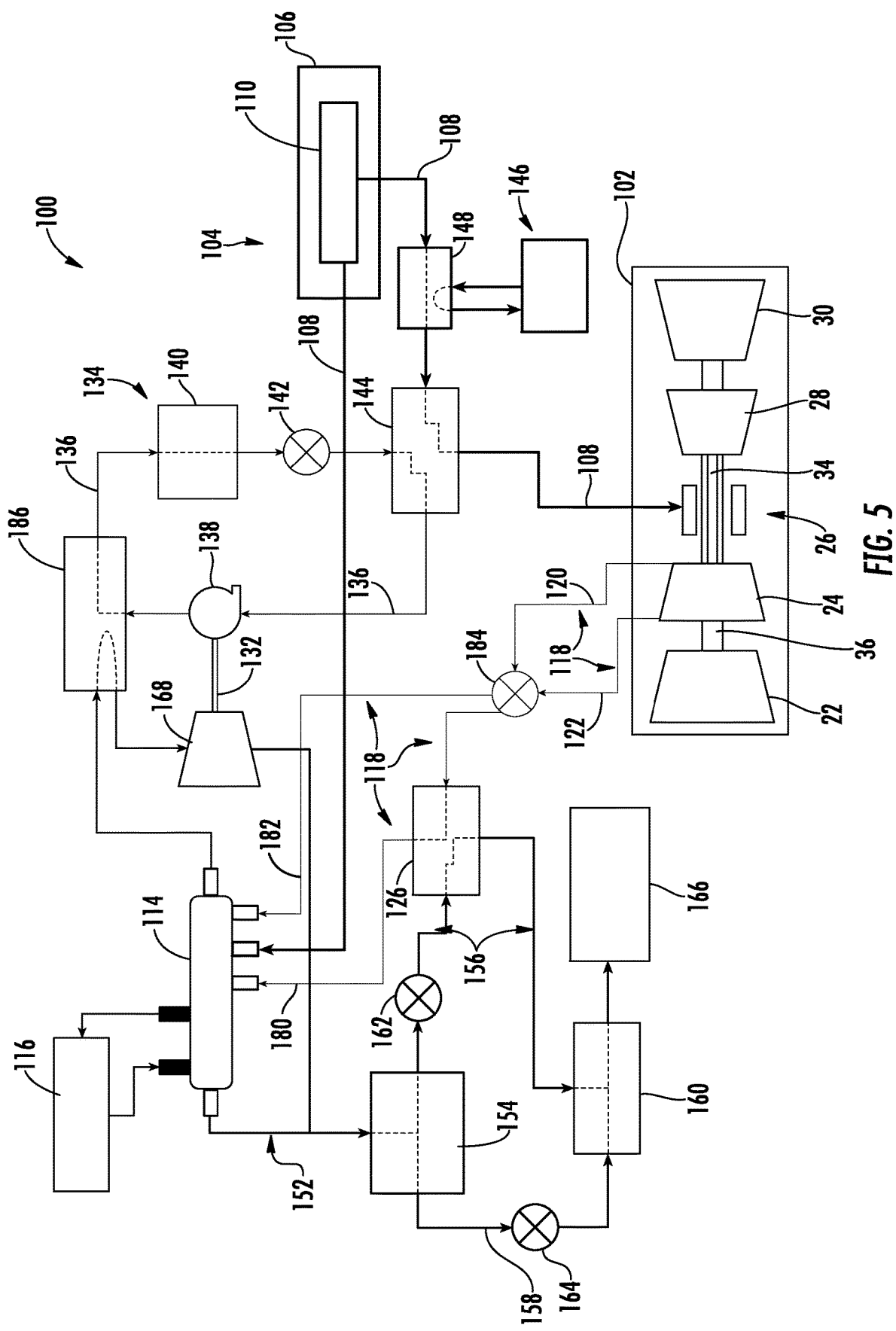
FIG. 5 is a schematic, flow diagram of the gas turbine engine assembly in accordance with still another exemplary embodiment of the present disclosure.

Moreover, as noted, the exemplary air cycle assembly 112 of FIGS. 5 and 6 further includes the air cycle machine 114, which is configured to receive a bleed airflow from the compressor section of the turbomachine 102 of the exemplary gas turbine engine. The exemplary air cycle machine 114 is an "open-loop" air cycle machine 114, similar to the embodiments described above. However, for the embodiment depicted, the air cycle machine 114 is a "3-wheel" air cycle machine 114 (as opposed to be "2-wheel" air cycle machines described above).

More specifically, referring particularly to FIG. 6, providing a close-up, schematic view of the exemplary air cycle machine 114, the exemplary air cycle machine 114 depicted includes a compressor 128 and a turbine. More specifically still, the turbine is a first turbine 130, and the air cycle machine 114 further includes a second turbine 176, as well as a combustor 178. The combustor 178 is in airflow communication with the second turbine 176 at a location upstream of the second turbine 176. Additionally, the second turbine 176 is rotatable with the compressor 128 of the air cycle machine 114 and the first turbine 130 of the air cycle machine 114 through a common ACS shaft 132. It will be appreciated, however, that although for the embodiment depicted the ACS shaft 132 is depicted schematically as a single component, in other exemplary embodiments, the ACS shaft 132 may instead be configured as a plurality of components joined in any suitable manner. Additionally, one or more speed change mechanisms may be provided with the ACS shaft 132 such that certain portions are rotatable at different speeds than others.

Briefly, as is also depicted, the exemplary air cycle machine 114 of FIG. 5 further includes an electric machine (i.e., a starter motor/generator 150 for the embodiment depicted) rotatable with, or coupled to, the ACS shaft 132. In such a manner, the starter motor/generator 150 may be operable to assist with starting the air cycle machine 114 during certain operations (e.g., wherein a bleed airflow provided thereto is not sufficient to drive the air cycle machine 114), and further may be operable to extract electrical power from the air cycle machine 114 during other operations (e.g., wherein the bleed airflow provided thereto is more than sufficient to drive the air cycle machine 114).

Referring now back particularly to FIG. 5, it will be appreciated that the exemplary air cycle machine 114, or rather, the combustor 178 of the exemplary air cycle machine 114, is operable with the fuel delivery system 104 to receive a fuel flow from the fuel delivery system 104. In addition, the air cycle machine 114 is operable to receive two separate flows of bleed airflow from the compressor section of the turbomachine 102 depicted in FIG. 6. Specifically, for the embodiment depicted, the two flows of bleed airflow are distributed between a first supply line 180 and a second supply line 182, separated within the bleed line 118 via a splitter valve 184. The first supply line 180 provides a first flow of bleed airflow through, for the embodiment depicted, an ACS pre-cooler 126 and to the compressor 128 of the air cycle machine 114. By contrast, the second supply line 182 provides a second flow of bleed airflow to the combustor 178 of the air cycle machine 114. The second flow of bleed airflow may then be mixed within the combustor 178 with a fuel flow provided by the fuel delivery system 104 and combusted to generate combustion gases. The combustion gases may then be provided to the second turbine 176 of the air cycle machine 114, whereby such combustion gases are expanded and energy is extracted therefrom to assist with powering the air cycle machine 114.

As is also depicted in FIG. 6, and noted above, the air cycle assembly 112 further includes the ACS heat exchanger. More specifically, for the embodiment depicted, the air cycle assembly 112 includes a first ACS heat exchanger 116 and a second ACS heat exchanger 186. The first ACS heat exchanger 116 is in airflow communication with the compressor 128 and first turbine 130 of the air cycle machine 114, in substantially the same manner as the exemplary ACS heat exchanger 116 described above with reference to FIG. 2. Further, the second ACS heat exchanger 186 is in airflow communication with the second turbine 176 to receive an exhaust flow from the second turbine 176 of the air cycle machine 114.

Each of the first ACS heat exchanger 116 and second ACS heat exchanger 186 may be operable to remove heat from a respective airflow from the air cycle machine 114 therethrough. For the exemplary embodiment depicted, the first ACS heat exchanger 116 may be in thermal communication with, e.g., a bypass airflow passage of the gas turbine engine (such as the exemplary bypass airflow passage 56 described above with reference to FIG. 1). In such a manner, the first ACS heat exchanger 116 may utilize the bypass airflow passage as a heat sink for the air cycle machine 114. By contrast, the second ACS heat exchanger 186 is thermally coupled to the thermal transfer bus 134, such that heat may be extracted from the exhaust gas flow through the second ACS heat exchanger 186, and then provided to the fuel delivery system 104 (i.e., through a fuel heat exchanger 144, as described above). It will be appreciated, however, that in other embodiments, the first ACS heat exchanger 116 may also be thermally coupled to the thermal transfer bus 134, or any other suitable heat sink, and further that in other embodiments, the second ACS heat exchanger 186 may alternatively be thermally coupled to any other suitable heat sink, such as the bypass airflow passage (see FIG. 8).

Referring still to the embodiment of FIGS. 5 and 6, as with the embodiments described above, the cooled and expanded airflow from the first turbine 130 (downstream of the first ACS heat exchanger 116 and compressor 128) is provided through an outlet duct assembly 152, and more specifically, for the embodiment depicted, provided to an ACS thermal energy storage unit 154. The expanded in cooled airflow may then be provided either to the ACS pre-cooler 126, by way of a path 156, or directly to a mixing chamber 160, by way of a path 158, prior to being utilized for cooling a heat sink.

In addition, for the embodiment of FIGS. 5 and 6, the airflow from the second turbine 176, cooled through the second ACS heat exchanger 186, is utilized to drive a pump 138 of the thermal transfer bus 134 prior to being provided to the outlet duct assembly 152 of the air cycle assembly 112. More specifically, for the embodiment shown, the thermal transfer bus 134 utilizes a turbopump having a power turbine 168. An airflow from the second ACS heat exchanger 186 is provided through the power turbine 168 of the turbopump to drive the turbopump and, e.g., circulate thermal transfer fluid through the thermal transfer bus 134. The power turbine 168 expands the airflow therethrough, extracting energy and reducing a temperature thereof. Although not depicted, a separate mixing chamber or valve may be utilized to join the airflow from the turbopump with the airflow from the first turbine 130 of the air cycle machine 114 within the outlet duct assembly 152 at a location upstream of the thermal energy storage unit 154. Notably, however, in other embodiments, the airflow from the turbopump may be joined with the outlet duct assembly 152 at any other suitable location (e.g., downstream of the thermal energy storage unit 154, at the mixing chamber 160, etc.).

It will further be appreciated that the exemplary embodiment described with reference to FIGS. 5 and 6 is one exemplary embodiment of the present disclosure. In still other embodiments, the gas turbine engine assembly 100 may have still other suitable configurations. For example, in other exemplary embodiments, the pump 138 of the thermal transfer bus 134 may instead be driven directly by the air cycle machine 114 (e.g., by the ACS shaft 132; see, e.g., FIG. 4), or by any other suitable power source. Further, in still other exemplary embodiments, airflow from the second ACS heat exchanger 186 may not be provided to the outlet duct assembly 152, and instead may be provided to any other suitable heat sink (see FIG. 7, below). Moreover, in still other exemplary embodiments, the second ACS heat exchanger 186 may not be in thermal communication with the thermal transfer bus 134 (see FIG. 8, below).

Figure 7:
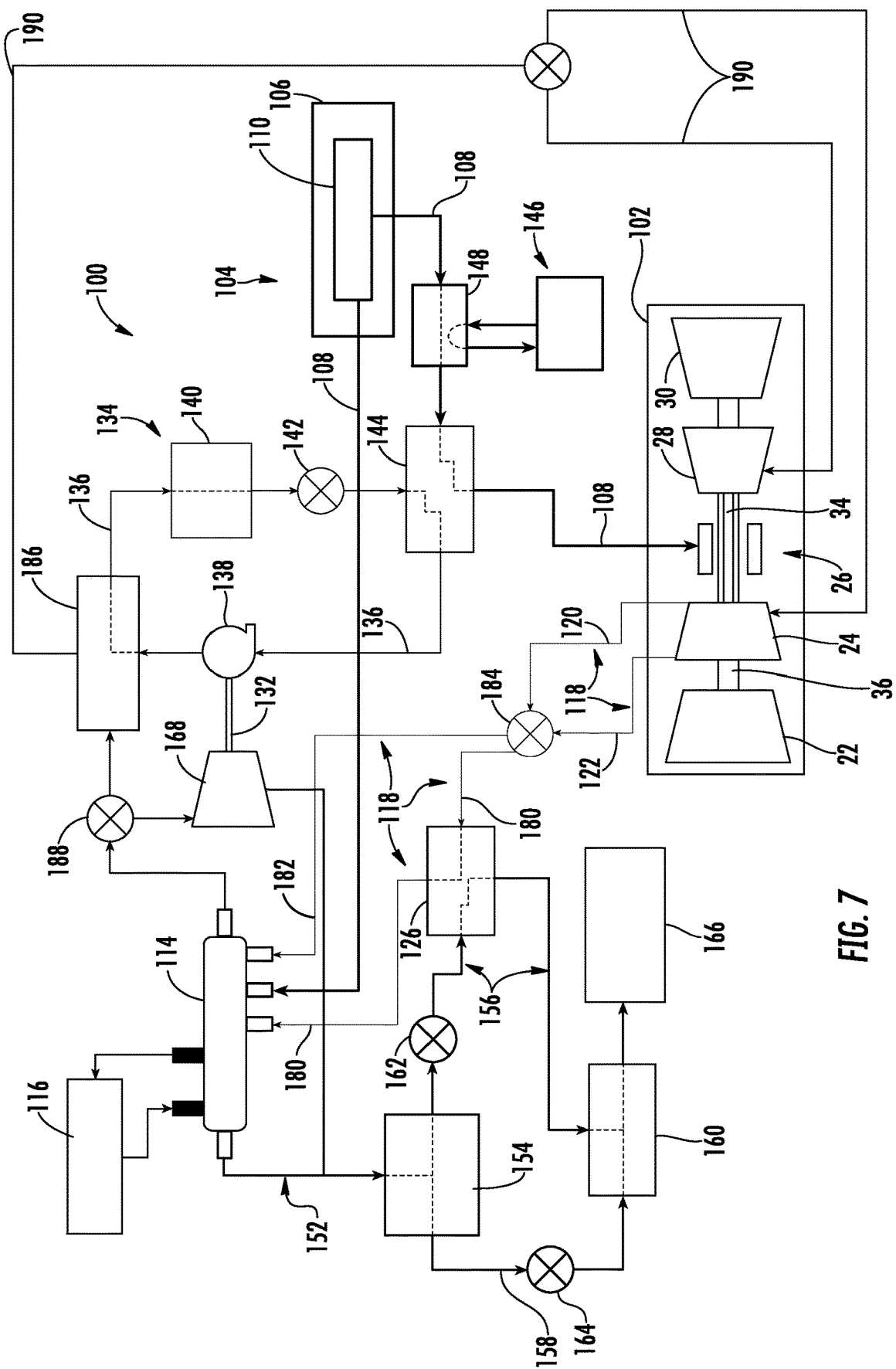
FIG. 7 is a schematic, flow diagram of the gas turbine engine assembly in accordance with yet another exemplary embodiment of the present disclosure.

For example, referring now particularly to FIG. 7, a schematic diagram of another exemplary embodiment of the present disclosure is provided. The exemplary gas turbine engine assembly 100 depicted in FIG. 7 may be configured in substantially the same manner as exemplary gas turbine engine assembly 100 described above with reference to FIGS. 5 and 6. However, for the exemplary embodiment of FIG. 7, airflow provided through the second ACS heat exchanger 186, thereby cooled by the thermal transfer bus 134, is not utilized for driving the pump 138 of the thermal transfer bus 134. Instead, the cooled airflow from the second ACS heat exchanger 186 is ducted directly to one or more heat sinks of the turbomachine 102 of the gas turbine engine through one or more ducts 190. Specifically, for the exemplary aspect depicted in FIG. 7, the cooled airflow from the second ACS heat exchanger 186 is provided directly to a low pressure turbine 22 of the turbomachine 102 of the exemplary gas turbine engine and a high pressure compressor 30 of the turbomachine 102 of the exemplary gas turbine engine. Notably, a portion of an airflow from the second turbine 176 of the air cycle machine 114 is additionally utilized to drive the pump 138 of the thermal transfer bus 134 for the embodiment of FIG. 7. Specifically, the air cycle assembly 112 includes a three-way, variable valve 188 at a location downstream of the second turbine 176 of the air cycle machine 114 and upstream of the second ACS heat exchanger 186 for diverting a flow through a power turbine 168 of the pump 138 of the thermal transfer bus 134 (such that the pump 138 is configured as a turbopump).

Figure 8:
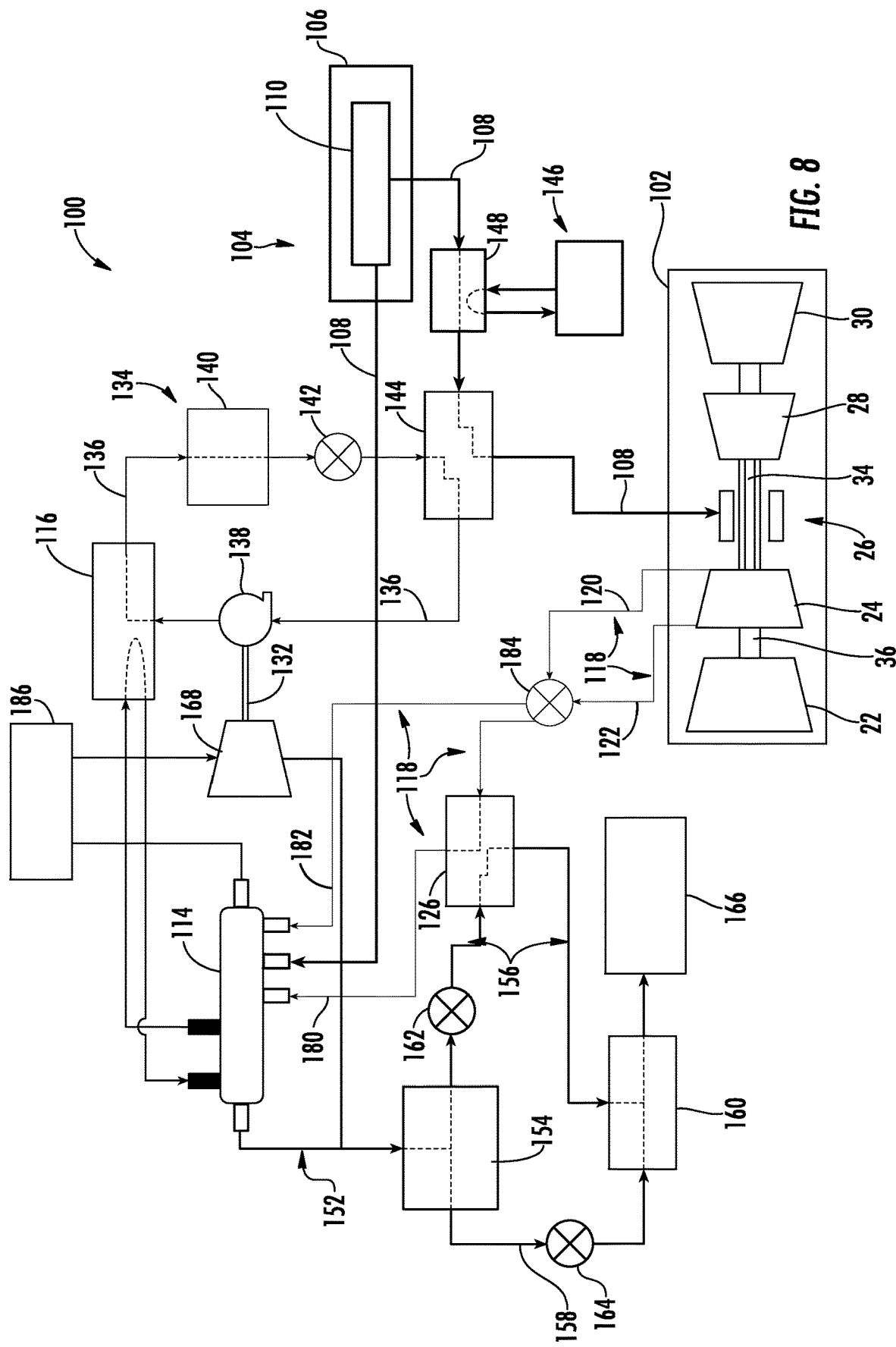
FIG. 8 is a schematic, flow diagram of the gas turbine engine assembly in accordance with still another exemplary embodiment of the present disclosure

Alternatively, by way of example, referring now particularly to FIG. 8, a schematic diagram of yet another exemplary embodiment of the present disclosure is provided. The exemplary gas turbine engine assembly 100 depicted in FIG. 8 may be configured in substantially the same manner as exemplary gas turbine engine assembly 100 described above with reference to FIGS. 5 and 6. However, for the exemplary embodiment of FIG. 8, the second ACS heat exchanger 186 is not in thermal communication with thermal transfer bus 134. Instead, for the embodiment of FIG. 8, the second ACS heat exchanger 186 may be in thermal communication with, e.g., a bypass airflow passage of the gas turbine engine (such as the exemplary bypass airflow passage 56 described above with reference to FIG. 1). In such a manner, the second ACS heat exchanger 186 may utilize the bypass airflow passage as a heat sink for the air cycle machine 114. By contrast, the first ACS heat exchanger 116 is, for the embodiment depicted, thermally coupled to the thermal transfer bus 134, such that heat may be extracted from the airflow flow through the first ACS heat exchanger 116, and then provided to the fuel delivery system 104 (i.e., through a fuel heat exchanger 144, as described above). In such a manner, each of the first ACS heat exchanger 116 and second ACS heat exchanger 186 may still be operable to remove heat from a respective airflow from the air cycle machine 114 therethrough.

Inclusion of an air cycle assembly 112 in accordance with one or more exemplary embodiments of the present disclosure may allow for a more efficient air cycle assembly 112 and gas turbine engine. More specifically, utilizing an air cycle assembly 112 configured to exchange heat with a fuel delivery system 104 of the gas turbine engine assembly 100 through an intermediate thermal transfer bus 134 may allow for efficiently removing a relatively large amount of heat from an air cycle machine 114 of the air cycle assembly 112, while simultaneously utilizing such heat to increase a temperature of a fuel flow through the fuel delivery system 104 to increase an efficiency of a combustion within the turbomachine 102 of the exemplary gas turbine engine assembly 100.

Figure 9:
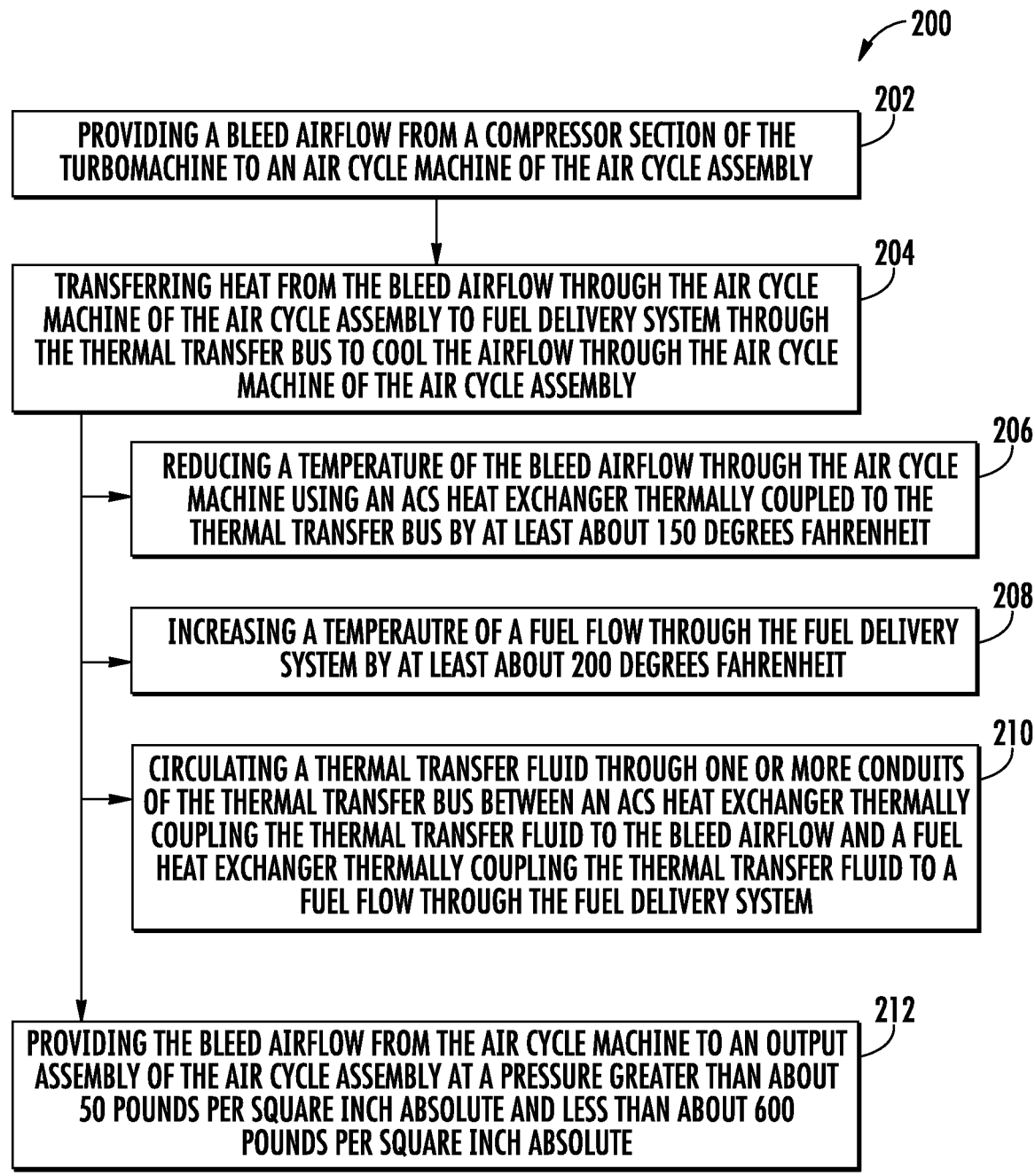
FIG. 9 is a method for operating a gas turbine engine assembly in accordance with an exemplary aspect of the present disclosure.

Referring now to FIG. 9, a flow diagram is provided of a method 200 for operating a gas turbine engine assembly in accordance with an exemplary aspect of the present disclosure. The exemplary method 200 of FIG. 9 may operate one or more of the exemplary gas turbine engine assemblies 100 described above with reference to FIGS. 1 through 7. Accordingly, the exemplary gas turbine engine assembly operated by the exemplary method 200 of FIG. 9 may generally include a turbomachine, a fuel delivery system, and air cycle assembly, and a thermal transfer bus.

The exemplary method 200 generally includes at (202) providing a bleed airflow from a compressor section of the turbomachine to an air cycle machine of the air cycle assembly. Additionally, the exemplary method 200 includes at (204) transferring heat from the bleed airflow through the air cycle machine of the air cycle assembly to the fuel delivery system through the thermal transfer bus to cool the airflow through the air cycle machine of the air cycle assembly.

For the exemplary aspect depicted in FIG. 9, transferring heat from the bleed airflow through the air cycle machine of the air cycle assembly to the fuel delivery system through the thermal transfer bus at (204) includes at (206) reducing a temperature of the bleed airflow through the air cycle machine using an ACS heat exchanger thermally coupled to the thermal transfer bus by at least about 150 degrees Fahrenheit. For example, reducing the temperature of the bleed airflow through the air cycle machine at (206) may include reducing the temperature of the bleed airflow through the air cycle machine by at least about 250 degrees Fahrenheit, such as at least about 300 degrees Fahrenheit, such as at least about 350 degrees Fahrenheit, such as up to 1000 degrees Fahrenheit, such as up to 750 degrees Fahrenheit.

Also for the exemplary aspect depicted in FIG. 9, transferring heat from the bleed airflow through the air cycle machine of the air cycle assembly to the fuel delivery system through the thermal transfer bus at (204) further includes at (208) increasing a temperature of a fuel flow through the fuel delivery system by at least about 200 degrees Fahrenheit. For example, increasing the temperature of the fuel at (208) may include increasing the temperature of the fuel by at least about 300 degrees Fahrenheit, such as by at least about 375 degrees Fahrenheit, such as by at least about 425 degrees Fahrenheit, such as by at least about 475 degrees Fahrenheit, such as up to about 1,250 degrees Fahrenheit, such as up to about 900 degrees Fahrenheit.

Further, still, for the exemplary aspect depicted in FIG. 9, transferring heat from the bleed airflow through the air cycle machine of the air cycle assembly to the fuel delivery system through the thermal transfer bus to cool the airflow through the air cycle machine of the air cycle assembly at (204) further includes at (210) circulating a thermal transfer fluid through one or more conduits of the thermal transfer bus between an ACS heat exchanger thermally coupling the thermal transfer fluid to the bleed airflow and a fuel heat exchanger thermally coupling the thermal transfer fluid to a fuel flow through the fuel delivery system. Although not depicted in FIG. 9, in certain exemplary aspects, circulating the thermal transfer fluid at (210) may include maintaining the thermal transfer fluid in a consistent state, such as a gas state, a liquid state, or a supercritical state.

Moreover, the exemplary method 200 depicted in FIG. 9 further includes at (212) providing the bleed airflow from the air cycle machine to an output assembly of the air cycle assembly at a pressure greater than about 50 pounds per square inch absolute and less than about 600 pounds per square inch absolute. For example, in certain exemplary aspects, the method 200 may provide the bleed airflow from the air cycle machine to the output assembly of the air cycle assembly at a pressure greater than about 75 pounds per square inch absolute, such as greater than about 100 pounds per square inch absolute, such as less than about 600 pounds per square inch absolute, such as less than about 450 pounds per square inch absolute, such as less than about 300 pounds per square inch absolute.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine assembly comprising:
   a turbomachine including a compressor section, a combustion section, and a turbine section in serial flow order;
   a fuel delivery system operable with the combustion section of the turbomachine for providing fuel to the combustion section of the turbomachine; and
   an air cycle assembly comprising an air cycle machine and a heat exchanger, the air cycle machine in airflow communication with the compressor section of the turbomachine and the heat exchanger in airflow communication with the air cycle machine,
   wherein the air cycle machine comprises a compressor for receiving and compressing a bleed airflow from the compressor section of the turbomachine and a turbine rotatable with the compressor and positioned downstream of the compressor, the turbine of the air cycle machine configured to expand and cool the compressed bleed airflow from the compressor,
   wherein the turbine of the air cycle machine is a first turbine,
   wherein the air cycle machine further comprises a second turbine and a combustor,
   wherein the combustor is located upstream of the second turbine,
   wherein the second turbine is rotatable with the compressor of the air cycle machine, and
   wherein the heat exchanger is in airflow communication with the second turbine of the air cycle machine at a location downstream of the second turbine of the air cycle machine.

2. The gas turbine engine assembly of claim 1, further comprising a thermal transfer bus thermally coupling the heat exchanger of the air cycle assembly to the fuel delivery system for transferring heat from the air cycle machine to the fuel delivery system.

3. The gas turbine engine assembly of claim 2, wherein the thermal transfer bus comprises a thermal energy storage unit.

4. The gas turbine engine assembly of claim 2,
   wherein the heat exchanger of the air cycle assembly is an air cycle system heat exchanger,
   wherein the thermal transfer bus comprises a fuel heat exchanger for transferring heat to the fuel delivery system, and
   wherein the fuel delivery system comprises a fuel cooled oil cooler at a location upstream of the fuel heat exchanger.

5. The gas turbine engine assembly of claim 2, wherein the air cycle assembly comprises a thermal energy storage unit at a location downstream of the air cycle machine.

6. The gas turbine engine assembly of claim 2, wherein the thermal transfer bus comprises a pump, and wherein the pump is driven by the air cycle machine.

7. The gas turbine engine assembly of claim 2, wherein the thermal transfer bus comprises a turbopump, wherein the turbopump comprises a power turbine.

8. The gas turbine engine assembly of claim 1, wherein the heat exchanger of the air cycle assembly is a second air cycle system heat exchanger, wherein the air cycle assembly further comprises a first air cycle system heat exchanger.

9. The gas turbine engine assembly of claim 8, wherein the first air cycle system heat exchanger is in thermal communication with a bypass airflow passage of the gas turbine engine assembly.

10. The gas turbine engine assembly of claim 1,
    wherein the heat exchanger of the air cycle assembly is a second air cycle system heat exchanger,
    wherein the air cycle assembly further comprises a first air cycle system heat exchanger, and
    wherein the first air cycle system heat exchanger is positioned downstream of the compressor of the air cycle machine and upstream of the first turbine of the air cycle machine.

11. The gas turbine engine assembly of claim 2,
    wherein the thermal transfer bus comprises a turbopump,
    wherein the turbopump comprises a power turbine in airflow communication with the air cycle machine at a location downstream of the second turbine of the air cycle machine.

12. The gas turbine engine assembly of claim 2, wherein the thermal transfer bus utilizes a single phase heat transfer fluid during operation.

13. A method for operating a gas turbine engine assembly comprising:
    a turbomachine including a compressor section, a combustion section, and a turbine section in serial flow order;
    a fuel delivery system operable with the combustion section of the turbomachine for providing fuel to the combustion section of the turbomachine;
    an air cycle assembly comprising an air cycle machine and a heat exchanger, the air cycle machine in airflow communication with the compressor section of the turbomachine and the heat exchanger in airflow communication with the air cycle machine,
    wherein the method comprises:
       providing a bleed airflow from the compressor section of the turbomachine to the air cycle machine of the air cycle assembly,
    wherein the air cycle machine comprises a compressor for receiving and compressing a bleed airflow from the compressor section of the turbomachine and a turbine rotatable with the compressor and positioned downstream of the compressor, the turbine of the air cycle machine configured to expand and cool the compressed bleed airflow from the compressor, wherein the turbine of the air cycle machine is a first turbine, wherein the air cycle machine further comprises a second turbine and a combustor, wherein the combustor is located upstream of the second turbine, wherein the second turbine is rotatable with the compressor of the air cycle machine, and wherein the heat exchanger is in airflow communication with the second turbine of the air cycle machine at a location downstream of the second turbine of the air cycle machine.

14. The method of claim 13, wherein the gas turbine engine assembly further comprises a thermal transfer bus thermally coupling the heat exchanger of the air cycle assembly to the fuel delivery system for transferring heat from the air cycle machine to the fuel delivery system, and wherein the method further comprises transferring heat from the air cycle machine of the air cycle assembly to the fuel delivery system through the thermal transfer bus.

15. The method of claim 14, wherein the transferring heat from the air cycle machine to the fuel delivery system through the thermal transfer bus comprises reducing a temperature of an exhaust gas flow of the air cycle machine using the heat exchanger.

16. The method of claim 14, wherein the transferring heat from the air cycle machine to the fuel delivery system further comprises increasing a temperature of a fuel flow through the fuel delivery system.

17. The method of claim 13, further comprising: providing the bleed airflow from the air cycle machine to an output assembly of the air cycle assembly.

18. The method of claim 14, wherein the transferring heat from the air cycle machine to the fuel delivery system comprises circulating a thermal transfer fluid through one or more conduits of the thermal transfer bus.

* * * * *